Nov. 1, 1932.  C. G. SUITS  1,885,155
CONTROL OF CONSTANT CURRENT CIRCUITS
Filed Feb. 18, 1932

Inventor:
Chauncey G. Suits,
by Charles V. Tullar
His Attorney.

Patented Nov. 1, 1932

1,885,155

UNITED STATES PATENT OFFICE

CHAUNCEY G. SUITS, OF SCHENECTADY, NEW YORK, ASSIGNOR TO GENERAL ELECTRIC COMPANY, A CORPORATION OF NEW YORK

CONTROL OF CONSTANT CURRENT CIRCUITS

Application filed February 18, 1932. Serial No. 593,809.

My invention relates to a constant current circuit including a source of constant current and one or more load elements responsive to said current. It is the object of my invention to provide a circuit of this type having means which is simple and entirely electrical for producing regularly recurring variations in the load current.

My invention will be better understood from the following description taken in connection with the accompanying drawing, and its scope will be pointed out in the appended claims.

Figure 1:
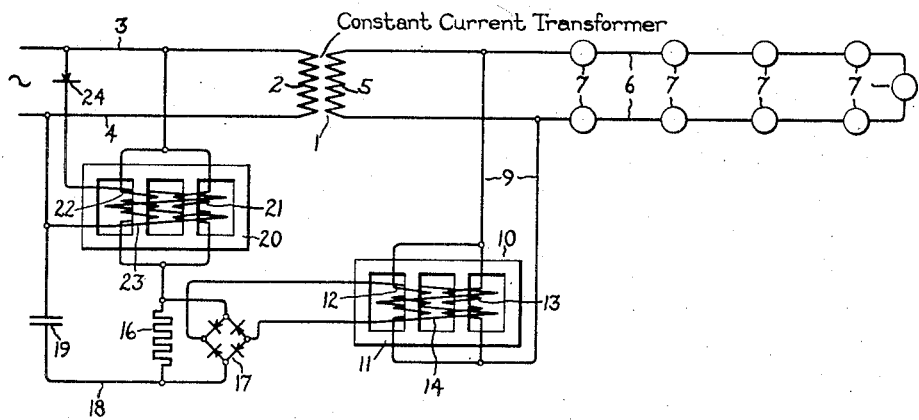
Figure 2:
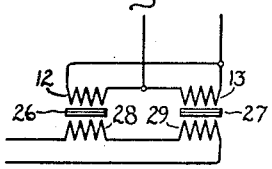

Referring to the drawing, Fig. 1 is a circuit diagram illustrating my invention, and Fig. 2 illustrates a modified form of a detail thereof.

In Fig. 1 I have shown at 1 a constant current transformer which may be of any well known form, such for example as that commonly employed for the supply of constant current lighting circuits. The primary 2 of transformer 1 is supplied from the substantially constant potential source 3 and 4 of alternating current, which source may for example be a 60 cycle, 110 volt commercial lighting circuit. The secondary 5 of the transformer connects with the load circuit 6 shown containing a plurality of load devices 7, which may be incandescent lamps. A constant current lighting circuit of this type is well known particularly in street lighting systems employing arc lamps in which case the current supplied is maintained commonly at a value of approximately 6.6 amperes. It will be understood, however, that where the load devices or lamps 7 require a lower current suitable adjustments or changes in construction are made in the transformer so as to give the desired current in the load circuit.

In accordance with my invention I provide the above described circuit with means for producing regularly recurring variations in the load current, which means is entirely electrical; that is, it has no moving parts. For this purpose I have provided a variable shunting means connected by the leads 9 across the secondary of the transformer. The shunting means provided comprises the saturable core reactor 10, together with means for supplying thereto a variable saturating current. In the form illustrated this reactor is represented as a four-legged core structure 11 having coils 12 and 13 wound in opposite directions on the two inner legs and connected in parallel with the leads 9 and a single saturating coil 14 surrounding both of the inner legs. Such a reactor is disclosed in the Alexanderson Patent No. 1,328,610, January 20, 1920. Saturating current is supplied to the winding 14 by connecting the same across resistor 16 through the full wave rectifier 17. Resistor 16 is included in a non-linear pulsating alternating current circuit 18 which is connected with the alternating current supply 3 and 4 and includes the capacitor 19 and the inductor 20. The latter is also a saturable core reactor which, for example, may have the same construction as that of reactor 10 in which case the coils 21 and 22 on the two inner legs are connected in series in the circuit 18 including resistor 16 and capacitor 19. The saturating winding 23 is connected in series with the rectifier 24 and is supplied from the alternating current source 3, 4. In the non-linear pulsating circuit 18 which has been disclosed and claimed in my copending application, Serial No. 510,750, filed January 23, 1931, and assigned to the same assignee as the present application, the effective value of the alternating current alternately increases and decreases with a uniform frequency which is not directly related to the frequency of the alternating current but which may be of the order of from ten per second to one in many seconds.

The operation of the apparatus will be readily apparent from the above description. The pulsating alternating current flowing in the non-linear circuit 18 causes a rectified saturating current to flow in the winding 14 of reactor 10 which current follows in magnitude the variations in effective value of the current in circuit 18. When the saturating current is a minimum the impedance of the shunt circuit provided by the reactor 10 across the transformer secondary is a maximum. Hence the amount of current diverted by the shunt circuit from the load circuit 6 is then a minimum. When the saturating current is a maximum the impedance of the shunt circuit provided by the reactor 10 across the transformer secondary is a minimum. Hence the amount of current diverted by the shunt circuit from the load circuit 6 is then a maximum. Since the load circuit and the shunt circuit are supplied by a constant current transformer the above described variations in the shunting capacity of the reactor cause corresponding variations in the current supplied to the load circuit and hence cause variations in the brilliancy with which the lamps 7 therein are illuminated. By suitable adjustments in the amount of capacitance, inductance, and resistance in the non-linear circuit 18, the pulsation period of this circuit and hence the periods of illumination of the lamps 7 in the load circuit may be varied within relatively wide limits. It will be noted that the above-described apparatus for producing current variations in the load circuit is entirely electrical in construction, being devoid of any moving parts. It will also be noted that there is no interruption of any circuit where sparking may occur which might give rise to radio interference.

Instead of using saturable core reactors of the form illustrated I may prefer to employ for each reactor a pair of separate similar transformers such as is shown at 26 and 27 of Fig. 2, the windings 12 and 13 of which are connected in parallel as in Fig. 1, and the saturating windings 28 and 29 preferably are connected in series with the source of unidirectional saturating current. Preferably either the windings 12 and 13, or the saturating windings 28 and 29 are reversely connected with their corresponding circuits thereby avoiding any alternating current being supplied to the rectifier from the transformers.

I have chosen the particular embodiment described above as illustrative of my invention, and it will be apparent that various other modifications may be made without departing from the spirit and scope of my invention, which modifications I aim to cover by the appended claims.

What I claim as new and desire to secure by Letters Patent of the United States is:

1. In combination, a constant current source, a load circuit connected therewith, means for shunting said load circuit and means entirely electrical for varying the impedance of said shunting means at regular recurring intervals.

2. In combination, a constant current transformer, a load circuit connected with the secondary thereof, shunting means connected across said load circuit and means entirely electrical for periodically varying the impedance of said shunting means.

3. In combination, a constant current source, a load circuit connected therewith, and means comprising a saturable core reactor connected across the source for varying the current in the load circuit at regularly recurring intervals.

4. In combination, a constant current transformer, a load circuit connected with the secondary thereof, a saturable core reactor connected across said secondary and means for supplying a variable saturating current to said reactor.

5. In combination, a constant current transformer, a load circuit connected with the secondary thereof and means for variably shunting said load circuit comprising a saturable core reactor and means having the same supply as the primary of said transformer for supplying a periodically varying saturating current to said reactor.

6. In combination, a constant current transformer, a load circuit connected with the secondary thereof, a saturable core reactor arranged to shunt said load circuit, a non-linear pulsating circuit and a rectifier connected therewith for supplying a variable saturating current to the reactor.

7. In combination, a constant current transformer, a load circuit connected with the secondary thereof, saturable core reactor arranged to shunt said load circuit, a non-linear pulsating alternating current circuit including a resistor, a capacitor and a second saturable core reactor, means for supplying a rectified saturating current to said second reactor, and a full wave rectifier having its input connected across said resistor and its output connected to supply saturating current to the first reactor.

In witness whereof, I have hereunto set my hand.

CHAUNCEY G. SUITS.